United States Patent [19]

Haas et al.

[11] Patent Number: 4,793,277
[45] Date of Patent: Dec. 27, 1988

[54] DETECTOR OF THE INFLATION PRESSURE OF MOTOR VEHICLE TIRES

[75] Inventors: Lothar Haas, Stein; Gerhard Hettich, Dietenhofen; Manfred Kamp; Hans-Dieter Schmid, both of Nuremberg; Hans Schrumpf; Berthold Walter, both of Oberasbach, all of Fed. Rep. of Germany

[73] Assignee: Robert Bosch GmbH, Stuttgart, Fed. Rep. of Germany

[21] Appl. No.: 112,509

[22] PCT Filed: Nov. 5, 1986

[86] PCT No.: PCT/DE86/00444
§ 371 Date: Aug. 6, 1987
§ 102(e) Date: Aug. 6, 1987

[87] PCT Pub. No.: WO87/03546
PCT Pub. Date: Jun. 18, 1987

[30] Foreign Application Priority Data

Dec. 12, 1985 [DE] Fed. Rep. of Germany ....... 3543864

[51] Int. Cl.$^4$ ................... H01H 35/26; B60C 23/04
[52] U.S. Cl. ........................... 116/34 R; 307/10 R; 340/58; 73/146.5; 200/61.22; 200/61.25; 116/246

[58] Field of Search .............. 307/10 R, 9; 116/34 R, 116/246, 315, 271, 285, 272, 204; 340/58, 52 F, 52 R, 521, 559, 669, 226; 152/418, 416, 431, 427; 200/61.22, 61.25, 61.26, 83 C, 83 L; 73/148.6, 745, 146.5, 146.4, 146.2; 137/227, 557, 228, 484.4, 517, 230

[56] References Cited

U.S. PATENT DOCUMENTS

| | | | |
|---|---|---|---|
| 3,985,984 | 10/1976 | Cappa | 200/61.22 |
| 4,211,901 | 7/1980 | Matsuda et al. | 340/58 X |
| 4,300,118 | 11/1981 | Matsuda et al. | 200/61.25 X |
| 4,435,625 | 3/1984 | Buschmid et al. | 200/61.22 |
| 4,701,742 | 10/1987 | Ruehr | 340/58 |

Primary Examiner—William M. Shoop, Jr.
Assistant Examiner—Paul Ip
Attorney, Agent, or Firm—Michael J. Striker

[57] ABSTRACT

A tire pressure detector for motor vehicles which is to be fastened to a wheel rim comprises a pressure switch actuated by the air pressure in the tire for monitoring the tire pressure. The pressure switch includes a reference pressure chamber with an electrically conductive switching diaphragm which closes the chamber toward the tire and which cooperates with a contact pin of the reference pressure chamber and an electric oscillating circuit connected to the latter in the detector housing. The reference pressure chamber (23) is axially clamped between a supporting ring and a spacing ring of insulating material in the metallic detector housing by a radial collar, which is formed, so that an annular gap is formed between the collar and the inner wall of the detector housing.

7 Claims, 2 Drawing Sheets

DETECTOR OF THE INFLATION PRESSURE OF MOTOR VEHICLE TIRES

BACKGROUND OF THE INVENTION

The invention relates to a tire pressure detector for motor vehicles.

In a known construction of a tire pressure detector (DE-OS No. 32 43 854), a reference pressure chamber, which is made from a metal housing, is received in a housing enclosure of insulating material which is screwed into a threaded borehole of the wheel rim by means of a threaded projection. The reference pressure chamber is closed in the front toward the tire by means of a switching diaphragm which cooperates with a contact pin in the reference pressure chamber and with an oscillating circuit in the housing enclosure which is connected to the contact pin. The fastening of the reference pressure chamber in the housing enclosure is effected by means of a metal sleeve which is inserted in the housing enclosure in a form-locking manner and which annularly encloses the reference pressure chamber in the area of the switching diaphragm by means of an inwardly curved rim. The housing enclosure of the tire pressure detector is meant to prevent the heat from reaching the reference pressure chamber when the wheel rim is heated and to prevent the gas which is enclosed in the reference pressure chamber from being heated to a greater extent than the compressed air in the tire.

The known solution has the disadvantage that the housing enclosure, which is made of insulating material, can easily be knocked off by the impact of a stone, which leads to a rapid loss of pressure in the tire and, accordingly, to an increased risk. Another disadvantage resides in that the metal sleeve in the housing enclosure clamps the switching diaphragm at the outer border so that tension can occur at the switching diaphragm, which impairs the switching accuracy of the tire pressure detector in an unwanted manner. It is known in another switch construction of the tire pressure detector (DE-OS No. 31 08 998) to weld the switching diaphragm on the outer rim of the reference pressure chamber so that it lies flat without tension; but the metallic reference pressure chamber in the housing enclosure of the tire pressure detector, which housing enclosure is made of insulating material, is held in this location only by means of a torus which can no longer withstand the centrifugal forces to a sufficient extent during temperature fluctuations and high speeds. Under unfavorable circumstances, the reference pressure chamber chan loosen and be thrown out of the housing enclosure into the interior of the tire, which can lead to a destruction of the tire.

The present solution attempts to achieve a secure mechanical fastening of the reference pressure chamber in the housing of the tire pressure detector while simultaneously achieving a favorable thermal communication with the air in the tire.

SUMMARY OF THE INVENTION

It is an object of the present invention to provide a tire pressure detector, which has the advantage that by means of using a metallic detector housing and by means of enclosing the collar of the reference pressure chamber, the latter can no longer be pressed forward or back. Moreover, the housing chamber of the tire pressure detector, which housing chamber is open in the direction of the compressed air in the tire, is closed toward the back by the housing so as to be sealed against pressure in order to prevent the compressed air in the tire from escaping when the tire pressure detector is damaged by a blow from a stone. It is another advantage of this invention that a thermal uncoupling of the reference pressure chamber from the metallic detector housing, and accordingly from the temperature of the wheel rim, is achieved by means of enclosing the collar of the reference pressure chamber by means of the supporting ring and the spacing ring, each of which is made of insulating material. Moreover, the radial collar, which is formed on at the outer circumference of the reference pressure chamber, ensures that the switching diaphragm is no longer clamped and, accordingly, can be kept free of mechanical tensions; this leads to an increased accuracy in the reproduction of the switching point.

It is particularly advantageous if the supporting ring is supported on an annular shoulder by means of an elastic sealing ring, the annular shoulder being formed on the detector housing; and the spacing ring, with a cover plate, fastens the reference pressure chamber at its collar by means of a flange at the front opening in the detector housing. The thermal uncoupling of the reference pressure chamber from the metallic detector housing can be further improved in that the detector housing is provided with an annular groove at its inner wall at the level of the collar of the reference pressure chamber, which annular groove enlarges the annular gap. Another advantage, with respect to the tensionless fastening of the switching diaphragm, is achieved in that the switching diaphragm rests flat on a level flange at the front end of the reference pressure chamber, which flange projects axially relative to the collar, and the switching diaphragm is welded with the flange all around at its outer front side.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
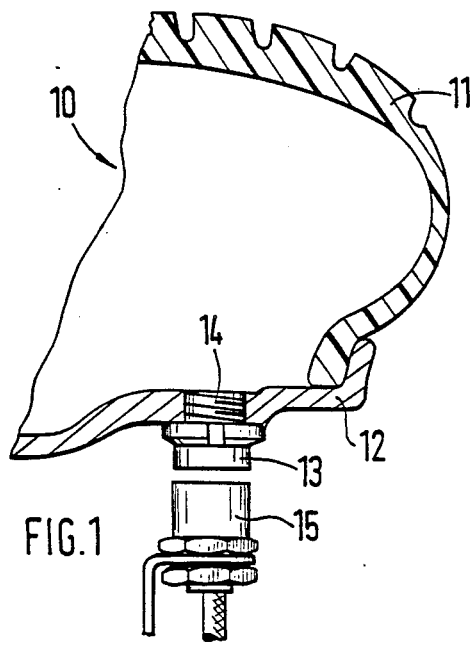
FIG. 1 shows a section of a vehicle wheel with the tire pressure detector, according to the invention, and the signal receiver assigned to it.

FIG. 1 shows a section of a motor vehicle wheel 10, in reduced scale and in cross section. A tire 11 is fastened on a wheel rim 12. A tire pressure detector 13 is screwed into a threaded borehole 14 of the wheel rim 12 at an inwardly directed portion of the wheel rim 12. At a slight distance from this, is positioned a signal receiver 15, whose front side is directed toward the tire pressure detector 13. The signal receiver 15 senses high-frequency oscillation in the tire pressure detector 13 during every revolution of the vehicle wheel 10. The signal receiver is fastened in the area of the tire pressure detector 13 at the wheel suspension of the vehicle, not shown.

Figure 2:
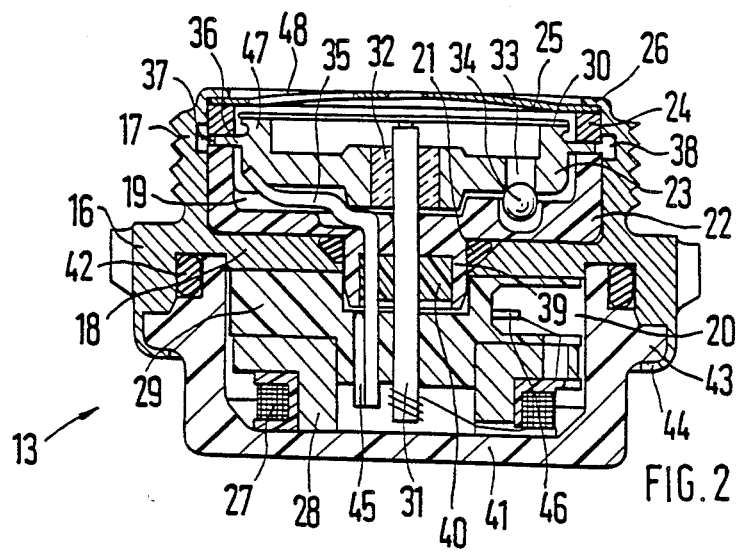
FIG. 2 shows the tire pressure detector, according to the invention, in enlarged scale, in cross section.

The construction of the tire pressure detector 13 is shown in cross section in FIG. 2. The pressure detector 13 comprises a detector housing 16, produced from steel or aluminum, and provided with a threaded projection 17 for fastening to the wheel rim 12. The detector housing 16 is open toward the tire 11. A wide annular shoulder 18, by means of which the detector housing 16 is divided into a housing chamber 19, which is opened toward the front, and an oscillating circuit chamber 20, which is located below chamber 19, is located in the central area of the detector housing 16. A sealing ring 21, a supporting ring 22 of plastic, a reference pressure chamber forming member 23 of steel, a spacing ring 24 of fibrous plastic material, and a perforated cover plate 25 are inserted in the housing chamber 19 at the inner rim of the annular shoulder 18 and are clamped at the front side of the detector housing 16 by means of a flange 26. The oscillating circuit chamber 20 below the annular shoulder 19 of the detector housing 16 contains a toroid coil 27, a ferrite core 28, a receiving member 29 of plastic, and a capacitor, not shown, inserted therein.

The reference pressure chamber forming member 23 is sealed against the the compressed air in the tire 11 by means of a flat switching diaphragm 30. In the center of the reference pressure chamber forming member 23, a contact pin 31 with a glass bushing 32 is fastened in the reference pressure chamber forming member 23 so as to be sealed against pressure and electrically insulated. The reference pressure chamber forming member 23 is filled with air or nitrogen with the required reference pressure via a filling duct 33 and the filling duct 33 is then closed so as to be sealed against pressure by means of a ball 34 which is pressed into the filling duct 33 or welded with it. Finally, one end of a connection wire 35 is welded to the reference pressure chamber forming member 23. The switching diaphragm 30 and the contact pin 31 are arranged relative to one another in such a way that there is an electrical connection betwen them when there is sufficient air pressure in the tire 11, which electrical connection closes the oscillating circuit consisting of the toroid coil 27 and the capacitor, which is not shown. If, on the other hand, the air pressure in the tire falls below the reference pressure in the reference pressure chamber formed by the member 23, the switching diaphragm 30 is lifted off the contact pin 31 and interrupts the oscillating circuit, which is detected by the signal receiver 15 by means of the high-frequency oscillation.

In order to achieve a thermal uncoupling of the reference pressure chamber forming member 23 from the metallic detector housing 16 or from the wheel rim 12, the reference pressure chamber forming member 23 is axially clamped in the detector housing 16 between the supporting ring 22 and the spacing ring 24 of insulating material by a radial collar 36 which is formed on the outer circumference of member 23. In so doing, an annular gap 37 is formed between the collar 36 and the inner wall of the detector housing 16. In order to improve the thermal uncoupling, the detector housing 16 is provided at its inner wall with an annular groove 38 at the level of the collar 36, which annular groove 38 enlarges the annular gap 37. Since the supporting ring 22, which is produced from plastic, and the spacing ring 24 incline toward a cold flow during mechanical loading and could accordingly cause the flange to loosen in the course of time, the sealing ring 21, which is provided for sealing the housing chamber relative to the oscillating circuit chamber 20, is constructed at the inner rim of the annular shoulder 18 in such a way that it acts as a spring element and simultaneously presses the supporting ring 22, the reference pressure chamber forming member 23, with its collar 36, the spacing ring 24, and the cover plate 25 against the flange 26 at the front opening of the detector housing 16, also with pretensioning. Thus, the sealing ring 21 encloses a projection 39 of the supporting ring 22 projecting through the opening of the annular shoulder 18. The contact pin 31 and the connecting wire 35 are guided through this projection 39 and sealed therein relative to the oscillating circuit chamber 20 with a sealing compound 40. The electric connections of the toroid coil 27, the capacitor, the contact pin 31 and the connection wire 35 are protected against the aggressive corrosion promoting tire air by means of the sealing ring 21 and the sealing compound 40. A plastic cap 41 closes the oscillating circuit chamber 20 outwardly in that it rests on the lower end of the detector housing 16 with another sealing ring 42 and is fastened at an annular shoulder 43 by means of a flange 44 at the detector housing 16. The connection wire 35 contacts a connection 45 of the capacitor, not seen, with its outer end, the other connection 46 being connected with one end of the toroid coil 27. Finally, the other end of the toroid coil 27 is connected with the free end of the contact pin 31.

The reference pressure chamber 23 is arranged in the tire pressure detector 13 in such a way that it is thermally uncoupled from the metallic detector housing 16, on the one hand, and causes no mechanical tension on the switching diaphragm 30, on the other hand. In addition, it is to be thermally connected to the tire air via the switching diaphragm 30 in the best possible manner so that the temperature of the gas in the reference pressure chamber would coincide with the temperature of the tire air. For this purpose, the switching diaphragm 30 lies flat on an axially protruding flange 47 of the reference pressure chamber forming member 23, the flange 47 projecting axially relative to the collar 36 of the member 23. The diaphragm 30 is welded with the flange 47 all around at its radial front side so as to be sealed against pressure and to be free of tension.

Figure 3:
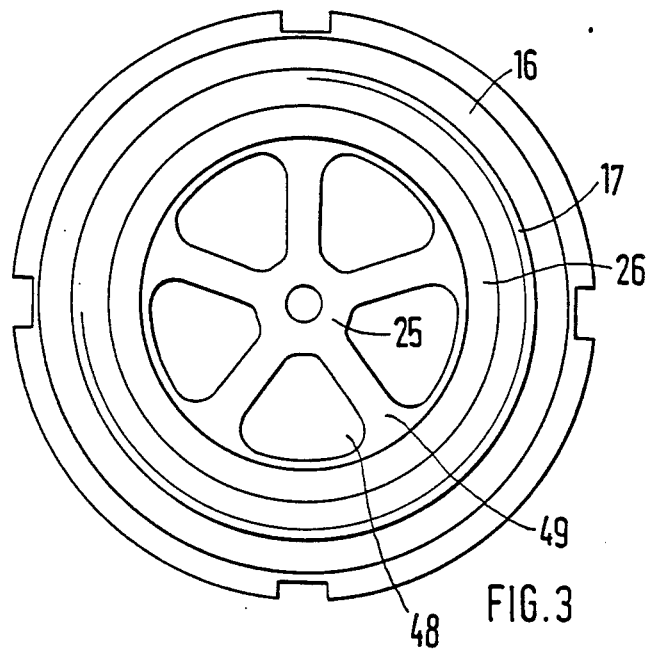
FIG. 3 shows the tire pressure detector of FIG. 2 in a top view.

According to FIG. 3, it can be seen that the switching diaphragm 30 is overlapped by the cover plate 25. It is to be achieved by means of this cover plate 35 that the tire air which flows past the tire pressure detector 13 during operation is swirled so that the heat transfer to the switching diaphragm 30, and according to the reference pressure chamber 23, be as optimal as possible. For this purpose, the cover plate 25, which is located in front of the switching diaphragm 30, is provided with segment-like openings 48 which are arranged adjacent to one another. The webs 49 remaining between the openings 48 cause the desired air swirling with a simultaneously large air through-flow cross section through the openings 48. Accordingly, they improve the heat transfer from the tire air to the reference pressure chamber forming member 23. The cover plate 25, moreover, protects the switching diaphragm 30 against damage by larger parts in the tire 11 which occasionally become detached from the rim or get there because of inexpert handling prior to the installation of the tire pressure detector 13 or during the mounting of the tire.

It will be understood that each of the elements described above, or two or more together, may also find a useful application in other types of tire pressure detectors differing from the types described above.

While the invention has been illustrated and described as embodied in a tire pressure sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a tire pressure detector for motor vehicles, comprising a pressure switch which is to be fastened to a circumference of a wheel rim and is actuated by air pressure in the tire for monitoring the tire pressure and which comprises an electrically conductive switching diaphragm; a member forming a reference pressure chamber closed toward the tire by said electrically conductive switching diaphragm; a contact pin supported in said member and cooperating with the switching diaphragm; electric oscillating circuit, the contact pin and the switching diaphragm being connected with said electric oscillating circuit; and a detector housing in which the reference pressure chamber is thermally insulated from the wheel rim, the improvement comprising a supporting ring (22), a spacing ring (24) of insulating material, said detector housing being metallic, said member (23) having a radially projecting collar (36), the member forming reference pressure chamber (23) being axially clamped between the supporing ring (22) and the spacing ring (24) in the metallic detector housing (16) at the collar (36) thereof so that an annular gap (37) is formed between the collar (36) and an inner wall of the detector housing (16).

2. Tire pressure detector according to claim 1, wherein said housing has an annular shoulder (18) and a flange (26) formed at a front end thereof; said switch further including an elastic sealing ring (21) and a cover plate (25), the supporting ring 22 resting on the annular shoulder (18) which is formed on in the detector housing (16) via the elastic sealing ring (21), and the spacing ring (24) with the cover plate (25) connecting the member which forms the reference pressure chamber (23) at said collar (36) to the flange (26) of the housing (16).

3. Tire pressure detector according to claim 1, wherein the housing (16) is provided at its inner wall with an annular groove (38) at the level of the collar (36), said annular groove (38) enlarging the annular gap (37).

4. Tire pressure detector according to claim 1, wherein said member forming the reference pressure chamber has a flange (47) which projects axially from the collar (36), the switching diaphragm (30) lying flat on the flange (47) and being welded all around at a radial front side thereof with the flange (47).

5. Tire pressure detector according to claim 2, wherein the cover plate (25) overlaps the switching diaphragm (30) and is provided with segment-like openings (48) arranged adjacent to one another.

6. Tire pressure detector according to claim 2, wherein said supporting ring (22) has a projection (39) which projects through an opening of the annular shoulder (18) of the housing (16) and is enclosed by said sealing ring (21), said member having a contact wire (35), said switch including an insulating circuit chamber (20), the contact pin (31) and the connection wire (35) projecting through the projection (39) into the oscillating circuit chamber (20) which accommodates a toroid coil (27) with a capacitor and with the member which forms the reference pressure chamber (23) to form an oscillating circuit.

7. Tire pressure detector according to claim 6, wherein electrical connections of the toroid coil (27), capacitor and contact pin (31) are protected against the tire air by said sealing ring (21) and a sealing compound (40) positioned in the projection (39) of the supporting ring (22).

* * * * *